(12) United States Patent
Choi et al.

(10) Patent No.: US 12,535,572 B2
(45) Date of Patent: Jan. 27, 2026

(54) METHOD AND APPARATUS FOR INTEGRATED ALGORITHM-BASED POSITION ESTIMATION

(71) Applicants: Hyundai Motor Company, Seoul (KR); Kia Corporation, Seoul (KR)

(72) Inventors: Jung Hun Choi, Hwaseong-si (KR); Dong Hyun Ha, Seoul (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 384 days.

(21) Appl. No.: 18/200,825

(22) Filed: May 23, 2023

(65) Prior Publication Data

US 2024/0125912 A1  Apr. 18, 2024

(30) Foreign Application Priority Data

Oct. 18, 2022 (KR) .......... 10-2022-0134031

(51) Int. Cl.
*G01S 13/46* (2006.01)
*B60W 50/14* (2020.01)
*G01S 13/931* (2020.01)

(52) U.S. Cl.
CPC ............ *G01S 13/46* (2013.01); *B60W 50/14* (2013.01); *G01S 13/931* (2013.01); *G01S 2013/466* (2013.01)

(58) Field of Classification Search
CPC .. G01S 13/46; G01S 13/931; G01S 2013/466; G01S 5/0218; G01S 13/876; G01S 2013/9329; G01S 2205/01; G01S 5/011; G01S 5/0205; G01S 5/0242; G01S 5/0278; G01S 5/0284; G01S 5/14; G01S 5/145; B60W 50/14; B33Y 50/00; G06F 16/334; G06F 17/00; G06F 2111/02; G06F 30/00
USPC ........................................... 342/450
See application file for complete search history.

(56) References Cited

U.S. PATENT DOCUMENTS

| | | | |
|---|---|---|---|
| 6,456,956 B1 * | 9/2002 | Xiong ................... | G01S 5/0218 702/94 |
| 9,809,223 B2 * | 11/2017 | Watanabe ............ | B60W 40/06 |
| 10,094,910 B2 * | 10/2018 | Hamilton ................ | G01S 13/76 |
| 10,347,129 B2 * | 7/2019 | Koravadi ............... | G08G 1/166 |
| 10,520,949 B2 * | 12/2019 | Hasberg .................. | G01S 19/42 |
| 11,178,348 B2 * | 11/2021 | McCauley ............ | G01S 13/931 |
| 11,272,421 B2 * | 3/2022 | Iwata .................... | H04W 40/22 |
| 11,457,330 B2 * | 9/2022 | Henry .................. | H04B 1/7163 |
| 11,577,717 B2 * | 2/2023 | Lim ...................... | G05D 1/0212 |
| 11,812,334 B2 * | 11/2023 | Henry ............... | H04W 74/0825 |

(Continued)

*Primary Examiner* — Nuzhat Pervin
(74) *Attorney, Agent, or Firm* — Morgan, Lewis & Bockius LLP

(57) ABSTRACT

A position estimation method is performed by a position estimation apparatus, wherein the position estimation method includes switching from a UWB static domain to a UWB dynamic domain when a startup state of a vehicle is switched from OFF to ON; operating one or more anchors mounted on the vehicle; and estimating a position of a tag by performing at least one of an advanced trilateration measurement (ATM) algorithm and a smart anchor positioning (SAP) algorithm, wherein the one or more anchors and the tag transmit and receive ultra wideband (UWB) pulse waves.

18 Claims, 15 Drawing Sheets

(56) References Cited

U.S. PATENT DOCUMENTS

| | | | |
|---|---|---|---|
| 11,827,178 B2* | 11/2023 | Baek | H02B 1/26 |
| 11,832,208 B2* | 11/2023 | Henry | H04W 64/00 |
| 12,217,604 B2* | 2/2025 | Gupta | G08G 1/163 |
| 12,248,086 B2* | 3/2025 | Nakashima | B60R 25/24 |
| 2012/0071170 A1* | 3/2012 | Cho | G01S 5/0289 |
| | | | 455/456.1 |
| 2014/0333481 A1* | 11/2014 | Fleck | G01S 5/06 |
| | | | 342/463 |
| 2016/0260324 A1* | 9/2016 | Tummala | G08G 1/04 |
| 2017/0123045 A1* | 5/2017 | Shin | G01S 5/0081 |
| 2018/0038694 A1* | 2/2018 | Bruemmer | G01C 21/005 |
| 2018/0041985 A1* | 2/2018 | Davaadorj | H04W 64/003 |
| 2018/0329076 A1* | 11/2018 | Santangelo | G01S 5/0226 |
| 2020/0124421 A1* | 4/2020 | Kang | G01S 17/06 |
| 2021/0061326 A1* | 3/2021 | Hanczor | B61L 25/025 |
| 2021/0070332 A1* | 3/2021 | Hanczor | H04W 4/42 |
| 2022/0001836 A1* | 1/2022 | Baek | G01S 13/878 |
| 2022/0032955 A1* | 2/2022 | Xiang | B60W 50/029 |
| 2022/0057475 A1* | 2/2022 | Nakashima | G01S 5/10 |
| 2022/0283321 A1* | 9/2022 | Ng | H04W 64/00 |
| 2023/0206740 A1* | 6/2023 | Micallef | H04W 4/023 |
| 2023/0209309 A1* | 6/2023 | Micallef | G01S 5/0205 |
| | | | 340/8.1 |
| 2023/0231613 A1* | 7/2023 | Haslinger | H04B 7/0632 |
| | | | 375/262 |
| 2023/0341499 A1* | 10/2023 | Chen | G01S 5/02 |
| 2025/0180733 A1* | 6/2025 | Shibata | G01S 13/765 |

* cited by examiner

METHOD AND APPARATUS FOR INTEGRATED ALGORITHM-BASED POSITION ESTIMATION

CROSS-REFERENCE TO RELATED APPLICATION

The present application claims priority to Korean Patent Application No. 10-2022-0134031, filed on Oct. 18, 2022, the entire contents of which is incorporated herein for all purposes by this reference.

BACKGROUND OF THE PRESENT DISCLOSURE

Field of the Present Disclosure

The present disclosure relates to an integrated algorithm-based position estimation method and device. More specifically, the present disclosure relates to a position estimation method and device for estimating a position of a dynamic object using Ultra WideBand (UWB) anchors mounted in a vehicle.

DESCRIPTION OF RELATED ART

The content described below merely provides background information related to the present embodiment and does not form the related art.

Ultra WideBand (UWB) technology is a near field wireless communication protocol that operates over radio waves at high frequencies. The UWB technology is a radio technology in which a frequency band of 500 MHz or more is used or a numerical value defined as a fractional bandwidth is 25% or more. The fractional bandwidth means a bandwidth of a signal with respect to a center frequency. That is, UWB is a radio technology in which a broadband frequency is used, and has various advantages such as high distance resolution, transparency, strong immunity to narrowband noise, and coexistence with other devices that share frequencies. The UWB technology is characterized by very precise spatial recognition and directionality, and mobile devices work to perceive a surrounding environment well. Various devices are connected through UWB, so that various functions from secure remote payment to locating a remote control may be performed. Furthermore, because accurate search may be made in a large area through UWB, a precise position of a restaurant or car may be ascertained using a smartphone.

In an autonomous vehicle and a general vehicle, it is important to ascertain precise positions of the vehicle and an object around the vehicle. Since a GPS-based positioning technology has an average error of 2 to 5 m in positioning accuracy, the average error is out of a minimum positioning error range required for autonomous traveling, which is within about 30 cm. Thus, it is necessary to ascertain a precise position of a vehicle and an object around the vehicle using the UWB technology.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a position estimation method performed by a position estimation apparatus, the position estimation method including: switching, by at least one processor of the position estimation apparatus, from an ultra wideband (UWB) static domain to a UWB dynamic domain when a startup state of a vehicle is switched from OFF to ON; operating, by the at least one processor, one or more anchors mounted on the vehicle; and estimating, by the at least one processor, a position of a tag by performing at least one of an advanced trilateration measurement (ATM) algorithm and a smart anchor positioning (SAP) algorithm, wherein the one or more anchors and the tag transmit and receive UWB pulse waves.

According to an exemplary embodiment of the present disclosure, a position estimation apparatus including a memory and a plurality of processors, wherein at least one of the plurality of processors switches from an ultra wideband (UWB) static domain to a UWB dynamic domain when a startup state of a vehicle is switched from OFF to ON, operates one or more anchors mounted on the vehicle, and estimates a position of a tag by performing at least one of an advanced trilateration measurement (ATM) algorithm and a smart anchor positioning (SAP) algorithm, wherein the one or more anchors and the tag transmit and receive UWB pulse waves.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
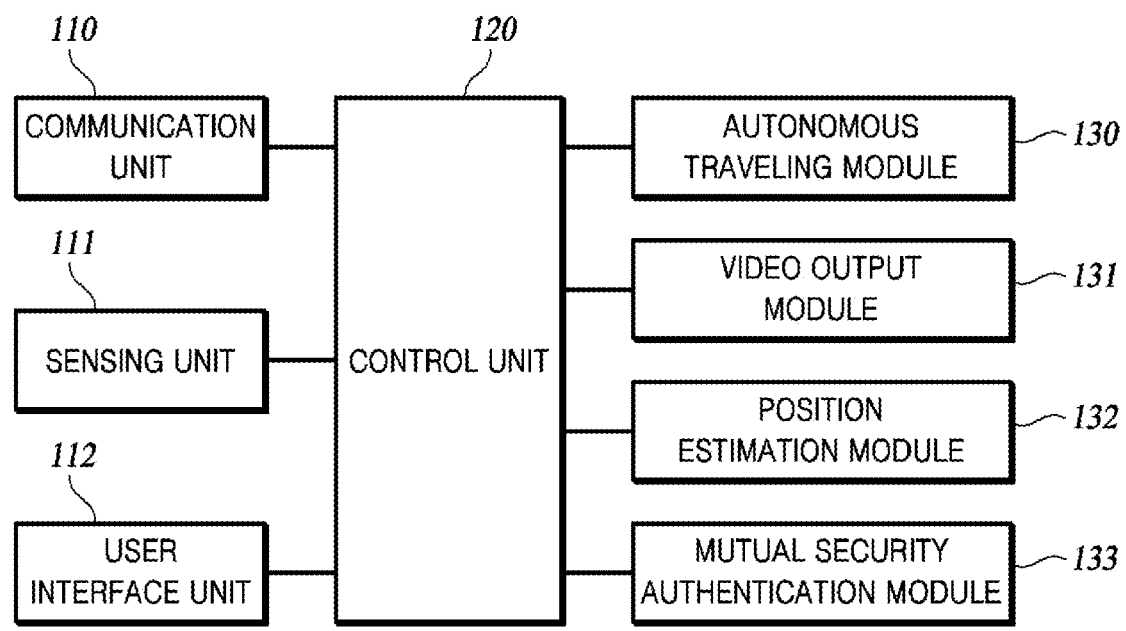
FIG. 1 is a diagram illustrating a control device mounted in a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An object of the present disclosure is to provide a method and device for estimating a position of an object using three anchors.

Another object of the present disclosure is to provide a method and device for estimating a position of an object using one anchor.

Yet another object of the present disclosure is to provide a method and device for improving a link formation rate using one anchor.

Yet another object of the present disclosure is to provide a method and device for classifying anchors into line-of-sight (LOS) anchors and non-line of sight (NLOS) anchors.

Yet another object of the present disclosure is to provide a method and device for converting from a static domain to a dynamic domain.

Yet another object of the present disclosure is to provide a method and device for estimating a position of an object using an integrated algorithm.

The problems to be solved by the present disclosure are not limited to the problems described above, and other problems not described will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary.

The following detailed description, together with the accompanying drawings, is directed to describe exemplary embodiments of the present disclosure, and is not intended to represent the only embodiments in which the present disclosure may be practiced.

FIG. 1 is a diagram illustrating a control device mounted in a vehicle according to an exemplary embodiment of the present disclosure.

Referring to FIG. 1, each autonomous vehicle may include a communication unit 110, a sensing unit 111, a user interface unit 112, a control unit 120, an autonomous traveling module 130, a video output module 131, a position estimation module 132, and a mutual security authentication module 133. The communication unit 110 may transmit or receive information between autonomous vehicles and between an autonomous vehicle and another object over a communication network. The communication unit 110 may transmit or receive information between autonomous vehicles and between an autonomous vehicle and another object through at least one communication scheme among a LAN (Wireless LAN), Wireless-Fidelity (Wi-Fi), Wireless Fidelity (Wi-Fi) Direct, Digital Living Network Alliance (DLNA), Wireless Broadband Internet (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

Furthermore, the communication unit 110 may perform near field communication (NFC) between autonomous vehicles and between an autonomous vehicle and another object. Since autonomous vehicles travel while maintaining a short distance between the autonomous vehicles, the communication unit 110 may transmit and receive information between the autonomous vehicles and between the autonomous vehicle and the other object through near field wireless communication. In the instant case, the communication unit 110 allows various types of information to be transmitted and received between autonomous vehicles and between an autonomous vehicle and another object, and the information may be transmitted and received through Bluetooth, Radio Frequency Identification (RFID), infrared data communication (IrDA), Ultra WideBand (UWB), ZigBee, Near Field Communication (NFC), Wireless-Fidelity (Wi-Fi), Wi-Fi Direct, Wireless Universal Serial Bus (Wireless USB), or the like.

The sensing unit 111 may include a radar, a camera, a Light Detection and Ranging (LiDAR), and the like. The sensing unit 111 may detect a speed and a position of a nearby autonomous vehicle and a speed and a position of a nearby object. The sensing unit 111 may detect any objects, including obstacles, people, animals, tollgates, breakwaters, and the like, in addition to autonomous vehicles. The user interface unit 112 may provide a user interface to a driver. The user interface unit 112 may receive information from the driver and input the information to the control unit 120 or output a result according to an operation. For example, the driver may input information on the nearby autonomous vehicle and information on the nearby object to the user interface unit 112. The user interface unit 112 may input the information on the nearby autonomous vehicle and the information on the nearby object to the control unit 120. The control unit 120 may issue a control command to the autonomous traveling module 130 by use of the information on the nearby autonomous vehicle and the information on the nearby object.

The control unit 120 may control the autonomous traveling module 130, the video output module 131, the position estimation module 132, and the mutual security authentication module 133 according to the information received from the communication unit 110, the sensing unit 111, and the user interface unit 112. The control unit 120 may include a trained learning model. The learning model may correspond to a deep learning-based model or a support vector machine model. The control unit 120 may further include a learning unit for training the learning model in advance. The learning unit can train the learning model in advance using supervised learning, unsupervised learning, semi-supervised learning, and/or reinforcement learning. Here, a specific method by which the learning unit trains the learning model based on learning data is common in a relevant field, and thus a detailed description thereof has been omitted.

The autonomous traveling module 130 may change or maintain a speed, direction, or the like of the vehicle according to a control command of the control unit 120. The video output module 131 may output an image of a nearby vehicle, a nearby obstacle, a nearby building, and the like to the driver according to the control command of the control unit 120. The position estimation module 132 may estimate a position of the nearby object by use of a trilateration technique according to a control command from the control unit 120. The mutual security authentication module 133 may perform authentication using an identifier (ID) between nearby vehicles and between nearby objects according to a control command of the control unit 120. Such authentication may be performed via a UWB. Autonomous vehicles can defend against a spoofing attack of an attacker through such authentication.

Figure 2:
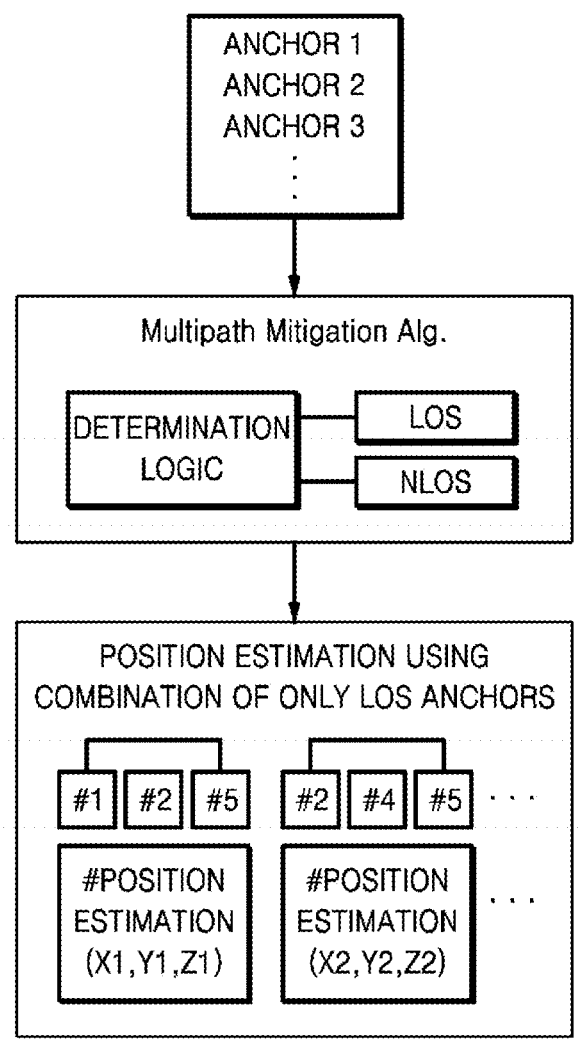
FIG. 2 is a diagram illustrating a process of estimating a position of an object using three line-of-sight (LOS) anchors according to an exemplary embodiment of the present disclosure.

FIG. 2 is a diagram illustrating a process of estimating a position of an object using three LOS anchors according to an exemplary embodiment of the present disclosure. The vehicle has a plurality of UWB anchors mounted therein. The UWB anchor may have the same meaning as an anchor. The LOS may mean a straight distance for electromagnetic waves to be able to travel in a straight line. The NLOS may mean a distance for the electromagnetic waves to be unable to travel in a straight line due to an obstacle or the like. When a distance between a tag and the anchor corresponds to the straight distance for the electromagnetic waves to be able to travel in a straight line, the present anchor may correspond to an LOS anchor. When the distance between the tag and the anchor corresponds to the distance for the electromagnetic waves to be unable to travel in the straight line, the anchor may correspond to an NLOS anchor. The LOS anchors and the NLOS anchors may be distinguished. Three or more anchors are required to apply the trilateration technique. Forming UWB links between three anchors and an object has a higher link formation rate than forming UWB links between four anchors and an object. Forming a UWB link between an LOS anchor and an object has a higher link formation rate than forming a UWB link between an NLOS anchor and an object.

Referring to FIG. 2, a plurality of anchors may be mounted in a vehicle. The plurality of anchors may be classified into LOS anchors and NLOS anchors by use of a multipath mitigation algorithm. The multipath mitigation algorithm may correspond to an algorithm for classifying anchors into LOS anchors and NLOS anchors using change in a received spectrum. Alternatively, the multipath mitigation algorithm may correspond to an algorithm for classifying anchors into LOS anchors and NLOS anchors using a histogram of errors. The multipath mitigation algorithm may be performed by a trained learning model of the control unit 120 of FIG. 1. The learning model can perform the multipath mitigation algorithm in consideration of a horizontal length, a tread width, or height of a nearby vehicle, a distance between nearby vehicles, a speed of nearby vehicles, building density, corner curvature, or the like. The position of the object may be estimated by combining three anchors among the classified LOS anchors and using the trilateration technique. Among the classified LOS anchors, the LOS anchor that has a high rate of formation of a link to the objects in consideration of the horizontal length, tread width, and height of the nearby vehicle, the distance between nearby vehicles, the speed of the nearby vehicles, the building density, the corner curvature, or the like may be assigned a weight. The weighted LOS anchor can become a reference anchor and form a link to the object.

The learning model may temporarily determine the anchor mounted in the vehicle to be a LOS anchor, and then, may finally determine the anchor to be a NLOS anchor in consideration of the horizontal length, tread width, and height of the nearby vehicle, the distance between nearby vehicles, the speed of the nearby vehicles, the building density, the corner curvature, or the like. The learning model may temporarily determine the anchor mounted in the vehicle to be an NLOS anchor, and accordingly, may finally determine the anchor to be an LOS anchor in consideration of the horizontal length, tread width, and height of the nearby vehicle, the distance between nearby vehicles, the speed of the nearby vehicles, the building density, the corner curvature, or the like.

For example, five anchors including anchor 1, anchor 2, anchor 3, anchor 4, and anchor 5 are mounted in the vehicle. The five anchors may be classified into LOS anchors and NLOS anchors by use of the multipath mitigation algorithm. Here, four anchors including anchor 1, anchor 2, anchor 4, and anchor 5 may be classified into LOS anchors, and anchor 3 may be classified into an NLOS anchor. The position of the object may be estimated by combining three anchors among the four LOS anchors and performing the trilateration technique. The trilateration technique may be performed with each of a combination of anchor 1, anchor 2, and anchor 4, a combination of anchor 1, anchor 2, and anchor 5, a combination of anchor 1, anchor 4, and anchor 5, or a combination of anchor 2, anchor 4, and anchor 5. The position of the object may be estimated according to each combination. An optimal anchor combination including a highest link formation rate and accuracy of the position may be selected using an error minimization objective function.

A position of the object estimated by performing the trilateration technique with the present optimal anchor combination may be finally used.

Figure 3:
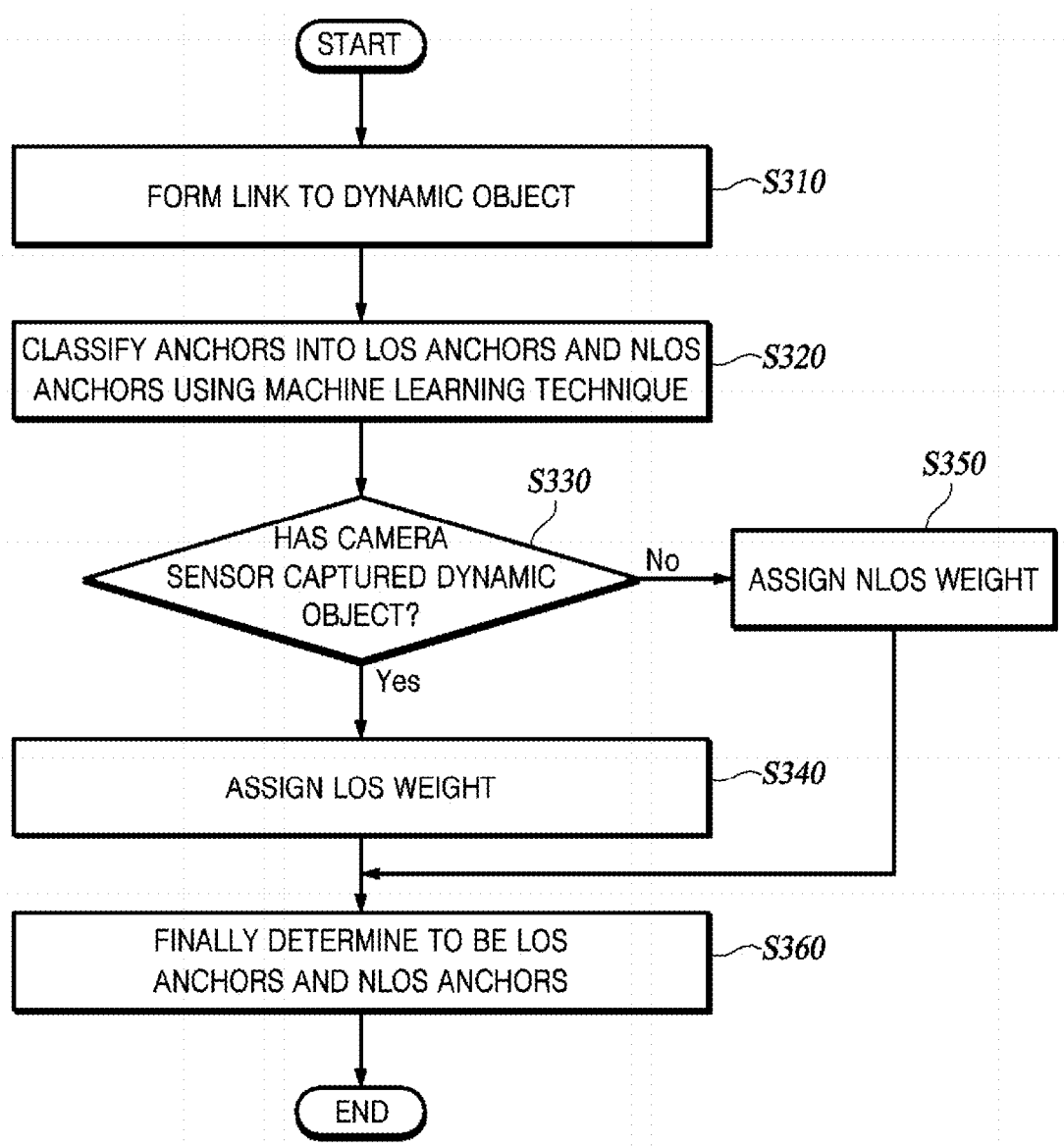
FIG. 3 is a diagram illustrating a process of classifying anchors into LOS anchors and non-line-of-sight (NLOS) anchors using a camera sensor according to an exemplary embodiment of the present disclosure.

FIG. 3 is a diagram illustrating a process of classifying anchors into LOS anchors and NLOS anchors using a camera sensor according to an exemplary embodiment of the present disclosure.

Referring to FIG. 3, one or more anchors mounted in a vehicle may form a UWB link to a dynamic object (S310). One or more anchors mounted in a vehicle may be temporarily determined to be LOS anchors and NLOS anchors using a machine learning technique (S320). The anchors may be temporarily determined to be the LOS anchor and the NLOS anchor using a deep learning model, a support vector machine model, or a convolution neural network (CNN) model. A determination may be made as to whether a camera sensor mounted in the vehicle has captured the dynamic object (S330). Not only camera sensors, but also various on-board sensors for vehicles, such as a radar or a LiDAR, may be used. The camera sensors can monitor surroundings of the vehicle based on vision. The camera sensor may be configured to determine in real time whether a dynamic object is present around the vehicle. When the camera sensor captures the dynamic object (S330—YES), a LOS weight may be assigned to the temporarily determined LOS anchor or NLOS anchor (S340). When the camera sensor does not capture the dynamic object (S330—NO), an NLOS weight may be assigned to the temporarily determined LOS anchor or NLOS anchor (S350). The one or more anchors mounted in the vehicle may be finally determined to be the LOS anchors and the NLOS anchors by use of the LOS weight or the NLOS weight (S360).

Even when the one or more anchors are temporarily determined to be the LOS anchors, the NLOS weight may be applied and the anchors may finally be determined to be the NLOS anchors. Even when the one or more anchors are temporarily determined to be the LOS anchor and the NLOS weight is applied, the one or more anchors may be finally determined to be the LOS anchors. Even when the one or more anchors are temporarily determined to be the NLOS anchors, the LOS weight may be applied and the anchors may be finally determined to be the LOS anchors. Even when the one or more anchors are temporarily determined to be the NLOS anchors and the LOS weight is applied, the one or more anchors may be finally determined to be the NLOS anchors.

Figure 4:
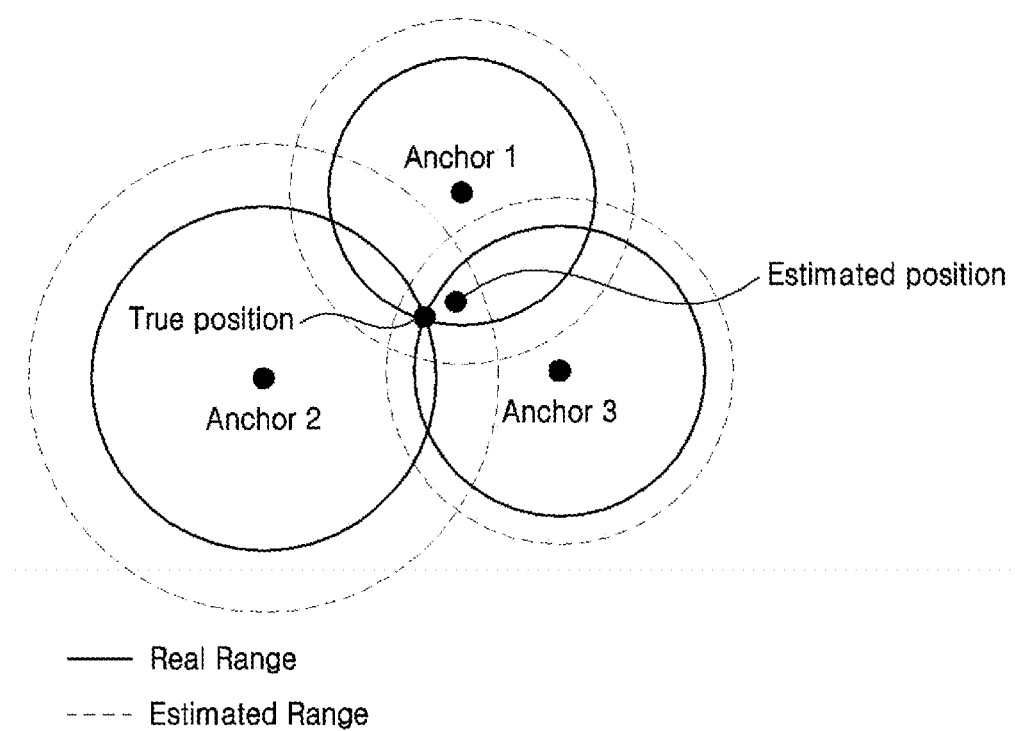
FIG. 4 is a diagram illustrating a method of estimating a position of an object by applying a trilateration technique to three anchors according to an exemplary embodiment of the present disclosure.

FIG. 4 is a diagram illustrating a method of estimating the position of the object by applying the trilateration technique to three anchors according to an exemplary embodiment of the present disclosure. The trilateration technique corresponds to a method of obtaining a relative position of an object using triangular geometry. In the trilateration technique, the position of the object may be obtained by use of distances between three reference points and the object. Three circles having the distance between each reference point and the object as a radius are formed. A point at which all three circles overlap corresponds to the position of the object.

Referring to FIG. 4, a circle having a distance between anchor 1 and the object as a radius, a circle having a distance between anchor 2 and the object as a radius, and a circle having a distance between anchor 3 and the object as a radius may be formed. A point at which all the three circles overlap may correspond to a true position of the object. Furthermore, a circle having an estimated distance between anchor 1 and the object as a radius, a circle having an estimated distance between anchor 2 and the object as a radius, and a circle having an estimated distance between anchor 3 and the object as a radius may be formed. A center position of a portion in which all the three circles overlap may correspond to an estimated position of the object.

Figure 5:
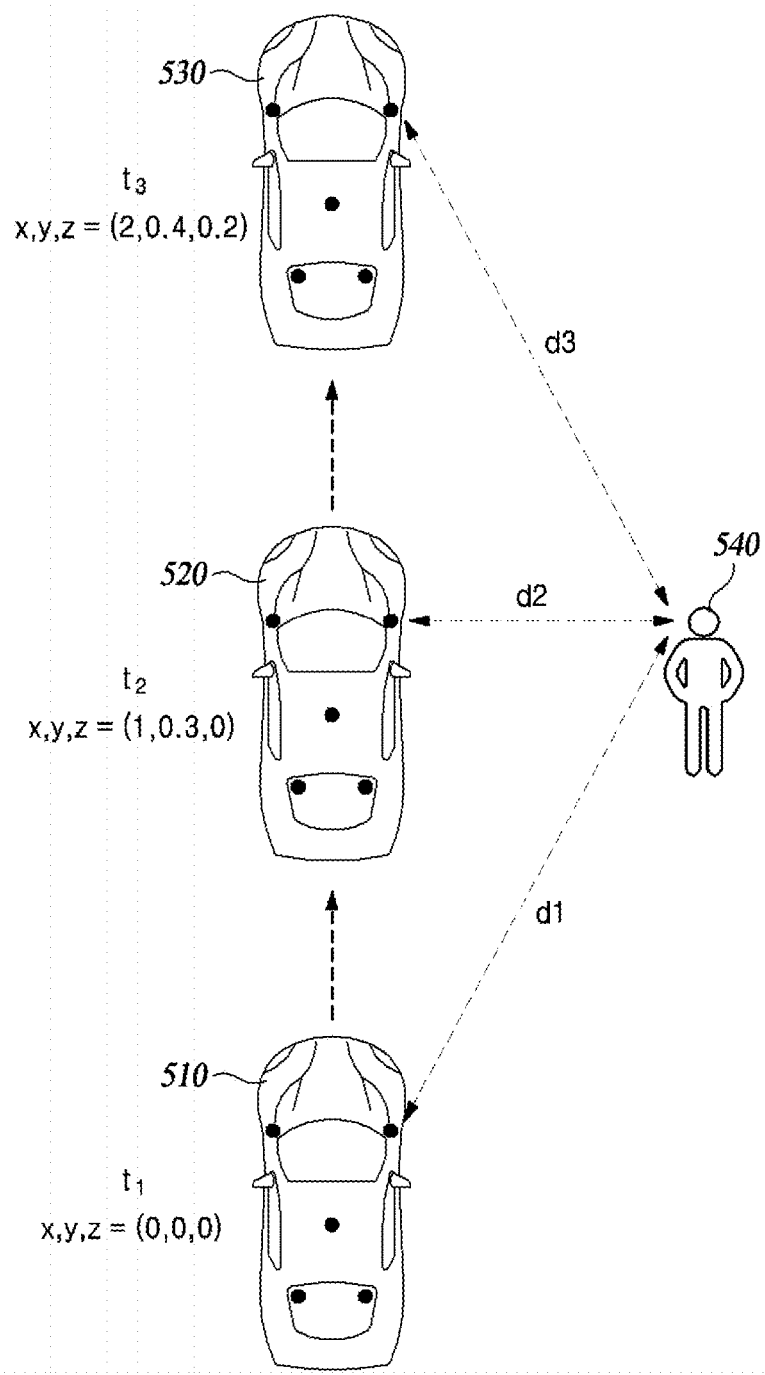
FIG. 5 is a diagram illustrating a distance between a position of a vehicle and a tag over time according to an exemplary embodiment of the present disclosure.

FIG. 5 is a diagram illustrating a distance between a position of a vehicle and a tag over time according to an exemplary embodiment of the present disclosure.

Referring to FIG. 5, a vehicle at a point in time $t_1$ (a "vehicle 510") may have five anchors mounted therein. Among the five anchors, one anchor on the right side of the front of the vehicle may be selected. Coordinates of the one selected anchor may correspond to (0, 0, 0). The one selected anchor may form a UWB link to a tag 540. An estimated distance d1 between the coordinates (0, 0, 0), which are the coordinates of one selected anchor, and the tag 540 may be determined.

Coordinates of one anchor selected in the vehicle at a point in time $t_2$ (the "vehicle 520") may correspond to (1, 0.3, 0). (1, 0.3, 0), which are the coordinates of the one selected anchor, may be obtained using a value of a movement distance of the vehicle for a time $t_2$-$t_1$. The value of the movement distance of the vehicle for time $t_2$-$t_1$ may be determined by use of odometry, the number of vehicle wheel rotations, a camera deep learning model, dead reckoning, a vehicle speed and direction, or the like. The one selected anchor may form a UWB link to the tag 540. An estimated distance d2 between (1, 0.3, 0), which are the coordinates of the one selected anchor, and the tag 540 may be determined.

Coordinates of one anchor selected in the vehicle at a point in time $t_3$ (the "vehicle 530") may correspond to (2, 0.4, 0.2). (2, 0.4, 0.2), which are the coordinates of the one selected anchor, may be obtained by use of a value of a movement distance of the vehicle for time $t_3$-$t_2$. The value of the movement distance of the vehicle for the time $t_3$-$t_2$ may be determined by use of odometry, the number of vehicle wheel rotations, a camera deep learning model, dead reckoning, the speed and direction of the vehicle, or the like. The one selected anchor may form a UWB link to the tag 540. An estimated distance d3 between (2, 0.4, 0.2), which are the coordinates of the one selected anchor, and the tag 540 may be determined.

Figure 6:
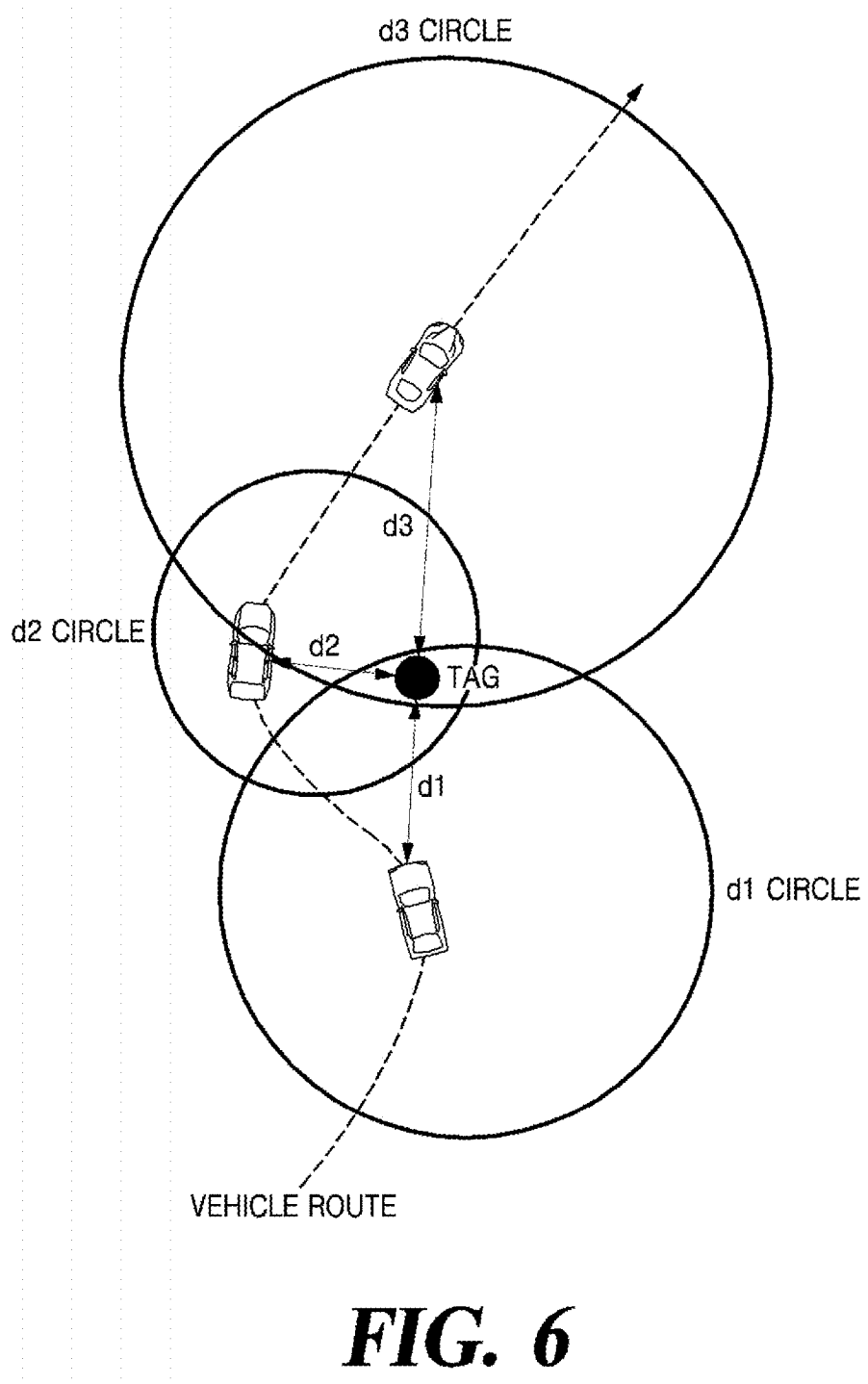
FIG. 6 is a diagram illustrating a process of estimating a position of a tag using the position of the vehicle over time according to an exemplary embodiment of the present disclosure.

FIG. 6 is a diagram illustrating a process of estimating a position of the tag using a position of the vehicle over time according to an exemplary embodiment of the present disclosure.

Referring to FIG. 6, a vehicle route may correspond to a route along which the vehicle moves for time $t_3$-$t_1$ in FIG. 5. The vehicle route may correspond to a movement route of the one anchor selected among the five anchors mounted in the vehicle in FIG. 5. Three coordinates on the movement route of the vehicle may be selected. The three coordinates may be used in the trilateration technique. The three coordinates may be selected using a vehicle speed, a direction, and angle of the vehicle, an absolute position at a point in time $t_1$, odometry, the number of vehicle wheel rotations, a camera deep learning model, and the like. Estimated distances between the respective coordinates and the tag may correspond to d1, d2, and d3. A d1 circle, a d2 circle, and a d3 circle may be generated with d1, d2, and d3 as radii. A center position of a portion in which the d1 circle, the d2 circle, and the d3 circle overlap may be estimated as the position of the tag. Each coordinate on the movement route of the vehicle may be stored in a memory of the vehicle. An estimated distance between each coordinate and the tag may also be stored in the memory of the vehicle. An algorithm for estimating the position of the tag through the present process may correspond to a smart anchor-based position estimation (SAP; Smart Anchor Positioning) algorithm.

The number of tags which may be recognized by performing the trilateration technique using one anchor mounted in the vehicle may be greater than the number of tags which may be recognized by performing the trilateration technique using three anchors mounted in the vehicle. When the trilateration technique is performed using one anchor mounted in a vehicle, an object detection rate and a link formation rate may be improved.

Figure 7A:
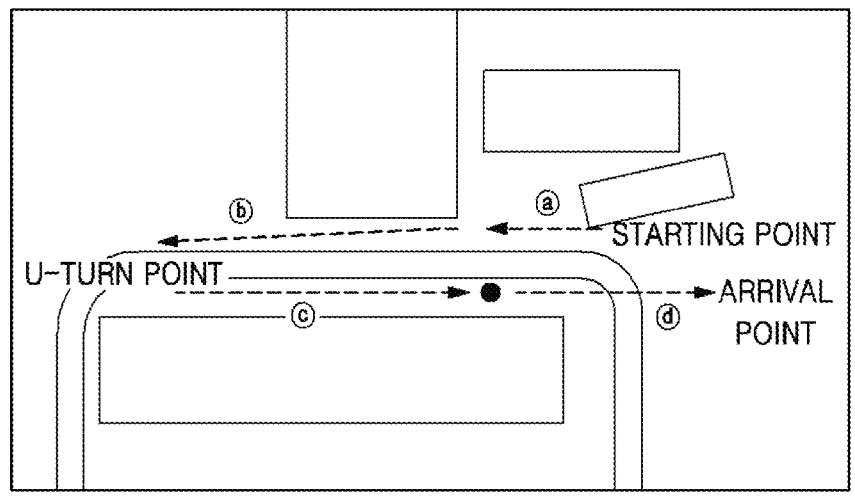
FIG. 7A and FIG. 7B are diagrams illustrating positions of tags and anchors when a vehicle including a plurality of anchors mounted therein moves according to an exemplary embodiment of the present disclosure.
Figure 7B:
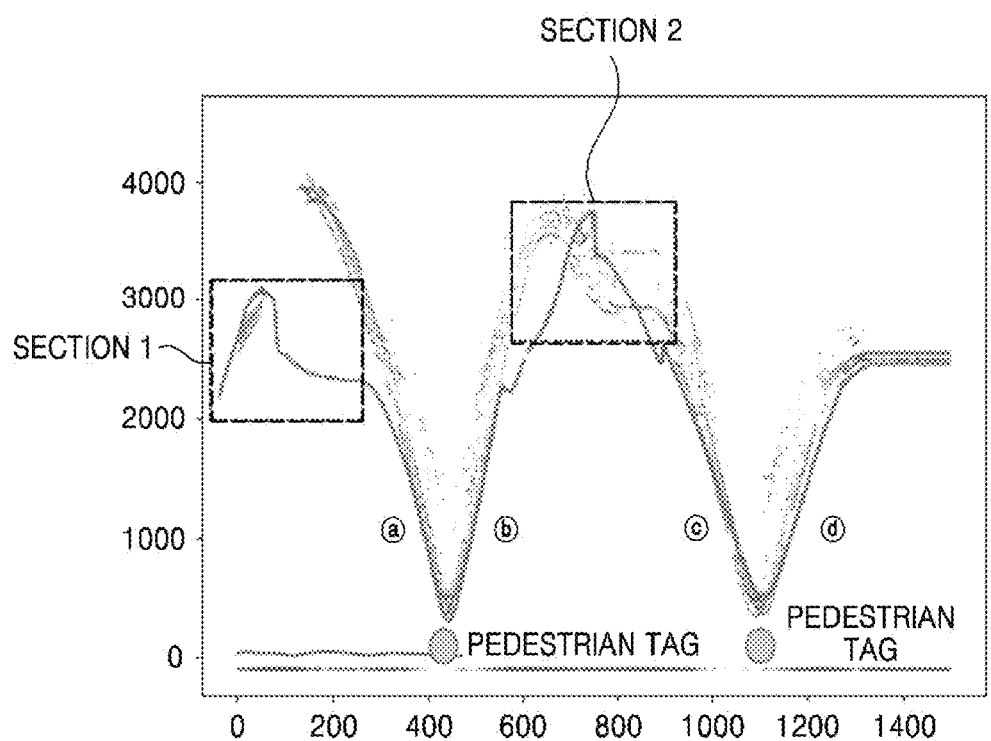

FIG. 7A and FIG. 7B are diagrams illustrating positions of tags and anchors when a vehicle including a plurality of anchors mounted therein moves according to an exemplary embodiment of the present disclosure.

Referring to FIG. 7A, the vehicle including the five anchors mounted therein on a map may pass a point a, a tag, and a point b from a starting point, make a U-turn, pass a point c, a tag, and a point d, and move to an arrival point. Positions of the five anchors may be changed according to the movement route of the vehicle.

Referring to FIG. 7B, as the vehicle moves in FIG. 7A, the positions of five anchors mounted in the vehicle may be expressed in coordinates. Section 1 may be unstable because absolute position coordinates of the anchor are not initially set. As the vehicle passes a point a and approaches a pedestrian tag, the position of the anchor may also approach the pedestrian tag. The vehicle may pass a point b and enter section 2. Section 2 may be unstable as the vehicle makes a U-turn. The vehicle may pass section 2, pass a point c, and approach a pedestrian tag. Accordingly, the position of the anchor may also approach the pedestrian tag. As the vehicle passes a point d and stops, the position of the anchor may also not change.

Figure 8:
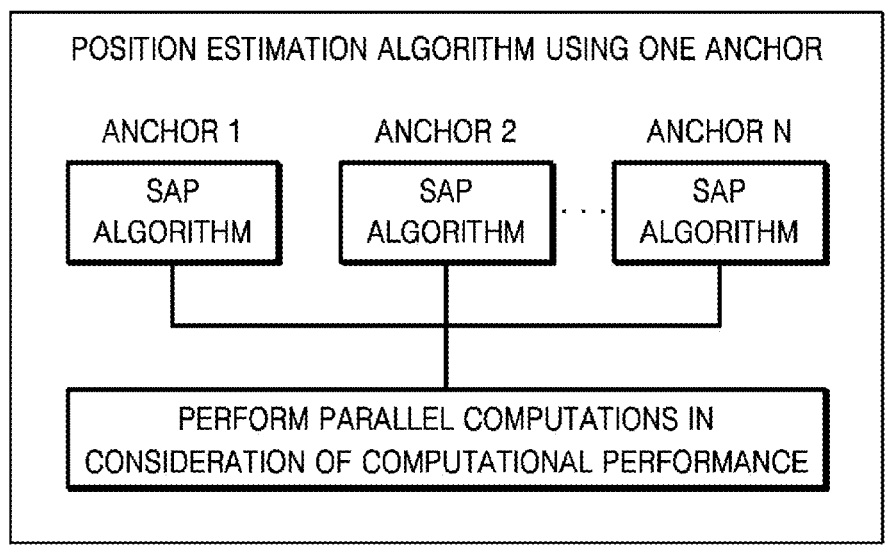
FIG. 8 is a diagram illustrating a method of applying a smart anchor-based position estimation algorithm to each of a plurality of anchors according to an exemplary embodiment of the present disclosure.

FIG. 8 is a diagram illustrating a method of applying a smart anchor-based position estimation algorithm to each of a plurality of anchors according to an exemplary embodiment of the present disclosure.

Referring to FIG. 8, an n number of anchors may be mounted in the vehicle. The smart anchor-based position estimation algorithm may be performed using each of the n anchors. The smart anchor-based position estimation algorithms using each of the n anchors may be performed in parallel in consideration of computational performance. An optimal anchor having a highest link formation rate and accuracy of the position may be selected using an error minimization objective function. The position of the object estimated by applying the trilateration technique to the present optimal anchor may be finally used.

Figure 9:
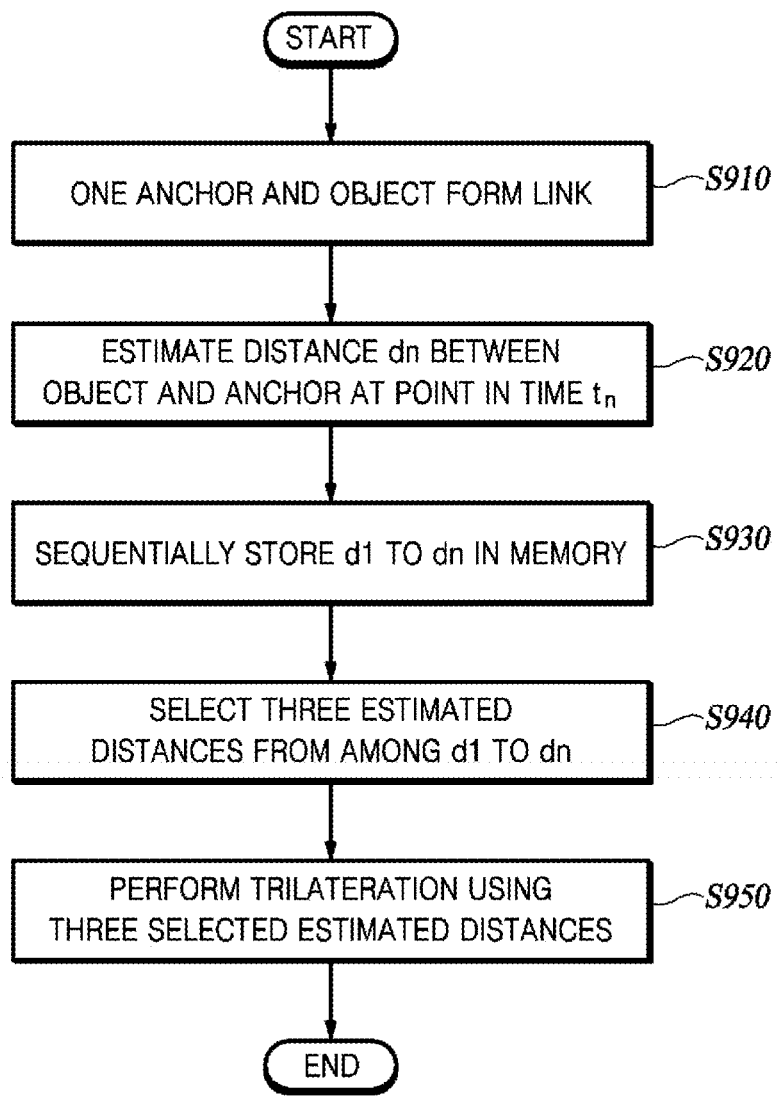
FIG. 9 is a diagram illustrating a process of estimating a position of a smart anchor-based object according to an exemplary embodiment of the present disclosure.

FIG. 9 is a diagram illustrating a process of estimating the position of the object using a smart anchor-based algorithm according to an exemplary embodiment of the present disclosure.

Referring to FIG. 9, one or more anchors may be mounted in a vehicle. One anchor and an object may form a link (S910). A distance dn between the object and the anchor at a point in time to may be estimated (S920). The distance dn between the object and the anchor may be estimated using coordinates of the anchor and coordinates of the tag at each point in time. The coordinates of the anchor at each point in time may be determined using a movement distance of the vehicle per hour. The movement distance of the vehicle per hour may be determined using a camera deep learning model, a speed of the vehicle, a wheel speed, odometry, dead reckoning, or the like. The estimated distances d1 to dn between the object and the anchor may be sequentially stored in the memory (S930). The coordinates of the anchor at each point in time may also be stored in the memory. Three estimated distances may be selected among d1 to dn (S940). Three coordinates may be selected from a movement route of the vehicle. Trilateration may be performed using the three estimated distances and the three coordinates that have been selected (S950). Three circles with the three estimated distances as radii may be formed. A center position of a portion in which the three circles overlap may be estimated as the position of the object.

Figure 10:
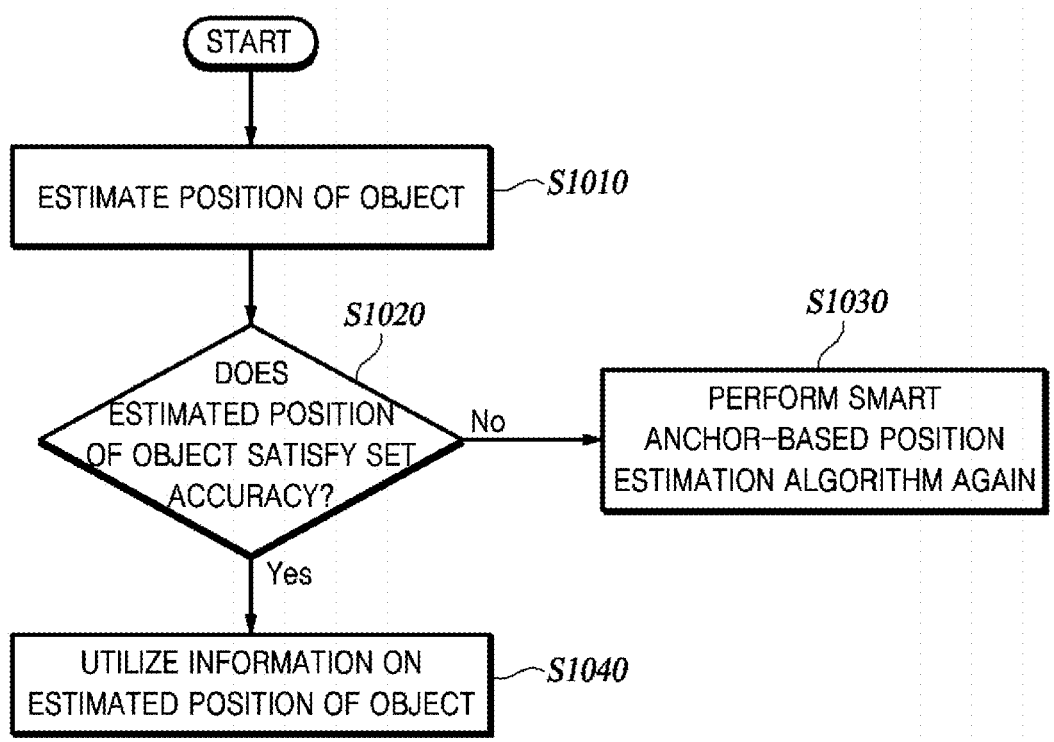
FIG. 10 is a diagram illustrating a process of utilizing an estimated position of an object according to the accuracy of the estimated position of the object according to an exemplary embodiment of the present disclosure.

FIG. 10 is a diagram illustrating a process of utilizing the estimated position of the object according to the accuracy of the estimated position of the object according to an exemplary embodiment of the present disclosure.

Referring to FIG. 10, the position of the object may be estimated using the smart anchor-based algorithm of FIG. 8 (S1010). A determination may be made as to whether the estimated position of the object satisfies set accuracy (S1020). The set accuracy may correspond to an arbitrary value. The estimated position of the object may be compared with a true position of the object. When the set accuracy is not satisfied (S1020—NO), the smart anchor-based position estimation algorithm may be performed again (S1030). Alternatively, a determination may be made as to whether a position of the object estimated by performing a smart anchor-based position estimation algorithm using another anchor satisfies the set accuracy. A determination may be made as to whether the position of the object estimated by performing the smart anchor-based position estimation algorithm again satisfies the set accuracy. When the set accuracy is satisfied (S1020—YES), information on the estimated position of the object may be utilized (S1040). The information on the estimated position of the object may be used as input data of various applications.

Figure 11:
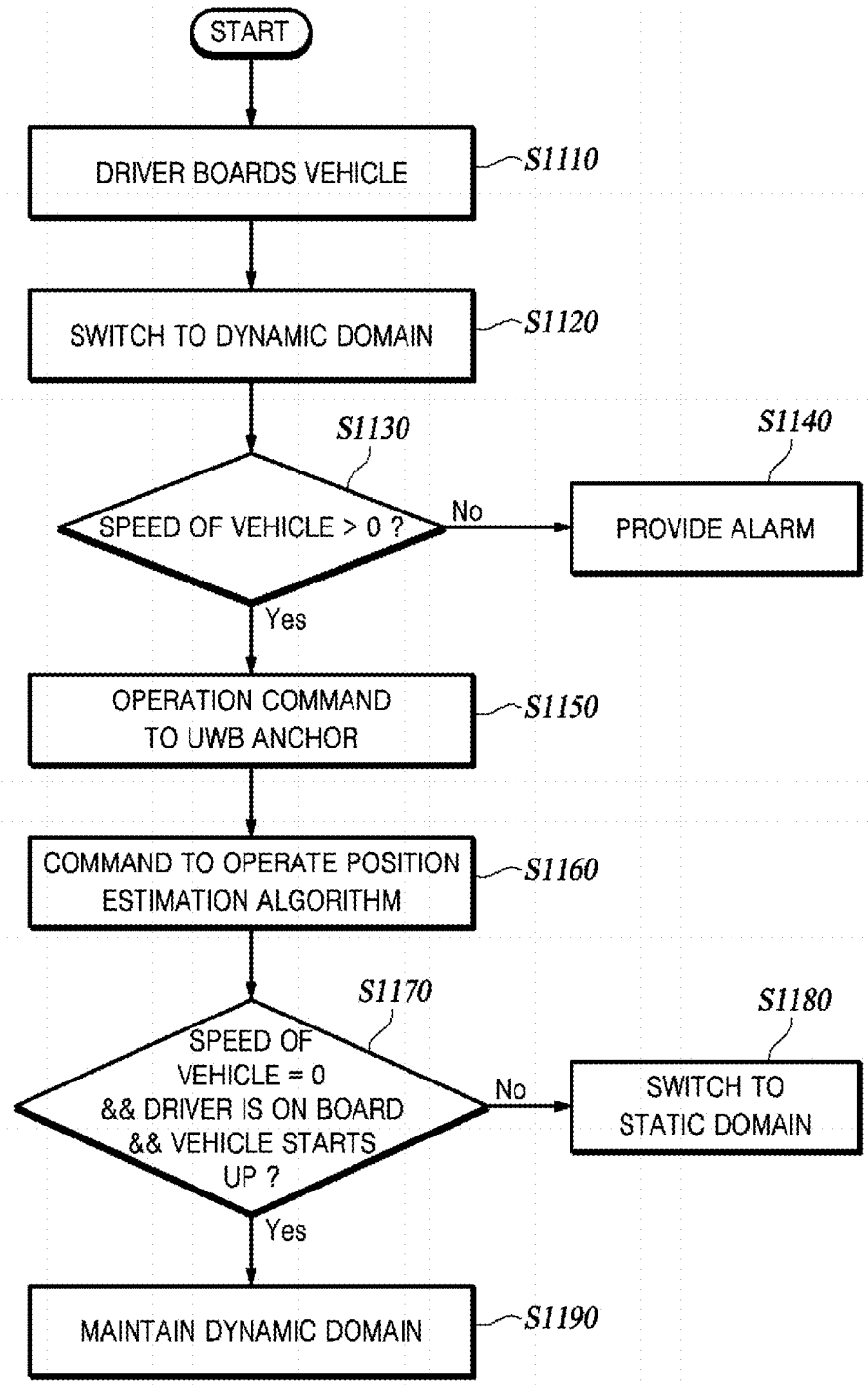
FIG. 11 is a diagram illustrating an algorithm for conversion from a static domain to a dynamic domain according to an exemplary embodiment of the present disclosure.

FIG. 11 is a diagram illustrating an algorithm for conversion from a static domain to a dynamic domain according to an exemplary embodiment of the present disclosure. The UWB anchor may be operated with a digital key of the vehicle. The static domain may refer to a control device, mounted in the vehicle, that operates in a state in which the vehicle is stopped. Furthermore, the static domain may refer to an operation which is performed by the control device mounted in the vehicle in a state in which the vehicle is stopped. A UWB static domain may have the same meaning as the static domain. The dynamic domain may refer to a control device, mounted in a vehicle, that operates in a state in which the vehicle is moving. Furthermore, the dynamic domain may refer to an operation which is performed by the control device mounted in the vehicle in a state in which the vehicle is moving. The UWB dynamic domain may have the same meaning as the dynamic domain.

Referring to FIG. 11, the driver may board a vehicle (S1110). The vehicle may be in a parked state. In the parked state, the vehicle may correspond to the static domain. The driver may carry the digital key. After the driver boards the vehicle, the vehicle may start up. In the case of a robo-taxi, the robo-taxi may start up even when the driver does not board the robo-taxi. The vehicle may be switched to the dynamic domain (S1120). The robo-taxi may be switched to the dynamic domain when the robo-taxi starts up without the driver boarding the robo-taxi. A determination may be made as to whether a speed of the vehicle exceeds zero (S1130). When the speed of the vehicle does not exceed zero (S1130—NO), an alarm may be provided to the driver (S1140). When the speed of the vehicle does not exceed zero, this means that the speed of the vehicle is zero. An alarm indicating that the digital key is active may be provided to the driver. When the speed of the vehicle exceeds zero (S1130—YES), the digital key may issue an operation command to the UWB anchor (S1150).

One or more UWB anchors may be mounted on the vehicle. The vehicle may supply power to the UWB anchors. The driver may be provided with an alarm indicating that the vehicle has been switched to the dynamic domain. An in-vehicle control device may issue a command to operate the position estimation algorithm (S1160). The position estimation algorithm may include an SAP algorithm and an advanced trilateration measurement (ATM) algorithm. The SAP algorithm is a smart anchor-based algorithm described in FIG. 6. The ATM algorithm is an algorithm for classifying the LOS anchors and the NLOS anchors described in FIG. 2, FIG. 3, and FIG. 4 and estimating the position of the object using three LOS anchors and a trilateration technique.

A determination may be made as to whether the speed of the vehicle is zero, the driver is on board, and the vehicle has started up (S1170). The vehicle may stop while waiting for a signal at an intersection. The vehicle may stop for parking. The vehicle may stop to avoid a collision with another vehicle. When the vehicle is stopped, the speed of the vehicle is zero. In the case of the robo-taxi, a determination may be made as to whether a speed of the robo-taxi is zero and the vehicle has started up. When the speed of the vehicle is zero and the driver is not on board or the vehicle is turned off (S1170—NO), the vehicle may be switched to the static domain (S1180). When the speed of the robo-taxi is zero and the vehicle is turned off, the robo-taxi may be switched to the static domain. When the speed of the vehicle is zero, the driver is on board, and the vehicle has started up (S1170—YES), the vehicle may be maintained in the dynamic domain (S1190). When the speed of the robo-taxi is zero and the vehicle has started up, the robo-taxi may be maintained in the dynamic domain.

Figure 12:
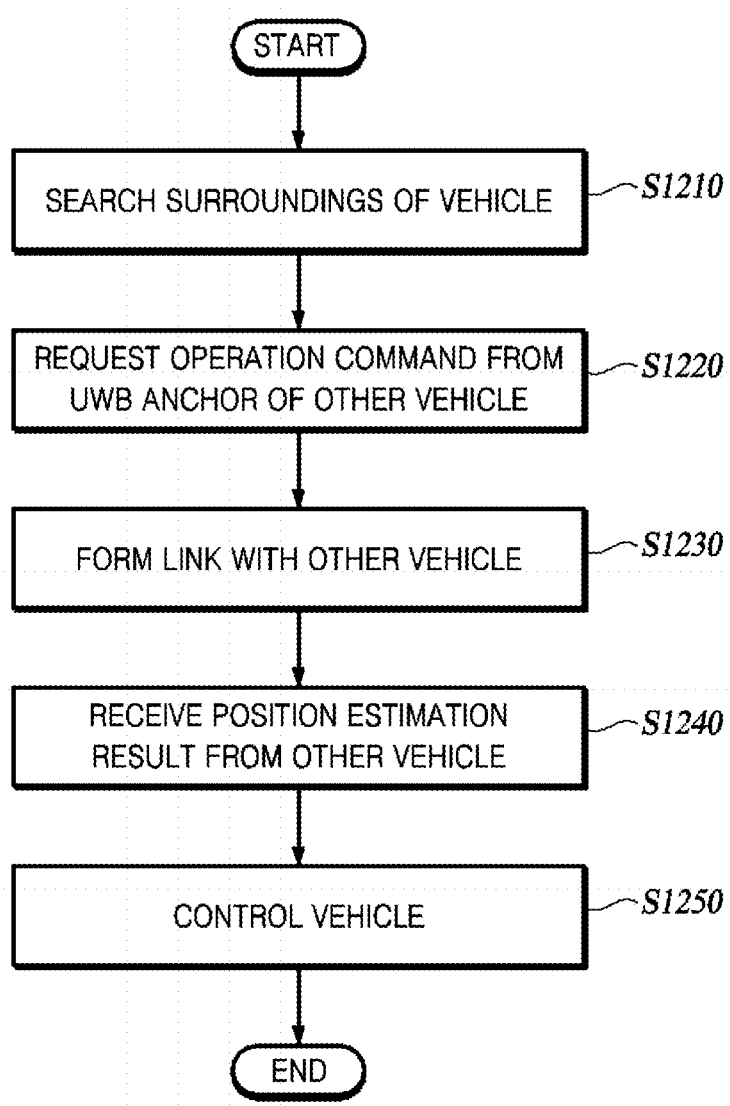
FIG. 12 is a diagram illustrating a process of estimating the position of the object by forming a link with another vehicle which is parked or stopped according to the exemplary embodiment of the present disclosure.

FIG. 12 is a diagram illustrating a process of estimating the position of the object by forming a link with another vehicle which is parked or stopped according to the exemplary embodiment of the present disclosure. Two objects in a LOS situation may mean that the two objects are in a visibility range. Two objects in a NLOS situation may mean that the two objects are not in the visibility range.

Referring to FIG. 12, when the driver starts the vehicle and begins traveling, the position estimation algorithm and the algorithm for conversion from a static domain to a dynamic domain may be performed. A control device mounted on the vehicle may search the surroundings of the vehicle (S1210). When the vehicle enters a controlled environment, such as a child protection area or a disabled person protection area, the control device may search the surroundings of the vehicle using Global Positioning System (GPS) information. When the vehicle enters a city, a blind spot, or a highway, the control device may search the surroundings of the vehicle using GPS information. The control device may detect whether a vehicle capable of UWB link formation exists around the vehicle. When the control device discovers the other vehicle capable of UWB link formation, the control device may send a position-based security authentication message to the other vehicle to form a secure UWB link. The position-based security authentication message may include a vehicle ID, vehicle position, vehicle state, vehicle power information, GPS information, and the like. Here, the vehicle driven by the driver and the other vehicle may be in a LOS situation.

The control device may request an operation command from a UWB anchor of the other vehicle (S1220). The control device may send a UWB link formation message to the other vehicle. The other vehicle may accept the UWB anchor operation command request and operate the UWB anchor. The other vehicle may attempt to form the UWB link. The other vehicle may be converted from the static domain to the dynamic domain. The UWB anchor of the other vehicle may be powered by an electronic control unit (ECU). The vehicle driven by the driver may form the UWB link with the discovered other vehicle (S1230). The other vehicle may form a UWB link with a nearby dynamic object and estimate a position of the nearby dynamic object.

The control device may receive a position estimation result from the other vehicle (S1240). The control device may receive information on the position of the dynamic object around the other vehicle. The control device may control the vehicle by use of the information on the position of the dynamic object around the other vehicle and the position of the other vehicle (S1250). Here, the other vehicle and the dynamic object may be in the LOS situation. The vehicle driven by the driver and the dynamic object may be in the NLOS situation. The control unit may provide an alarm to the driver to pay attention. The vehicle driven by the driver may decelerate or travel slowly. The vehicle driven by the driver may honk the horn to other vehicles. The vehicle driven by the driver may turn on a light in consideration of a route of a pedestrian, which is a dynamic object. The control device may provide an alarm to a device possessed by the dynamic object using wireless communication. This allows the vehicle driven by the driver to check the position of the dynamic object through the other vehicles even when the vehicle driven by the driver is in an NLOS situation with the dynamic object. Accordingly, a link formation range of the vehicle driven by the driver may be extended. The vehicle driven by the driver may form a UWB link with a plurality of other vehicles as well as another vehicle to check a position of a dynamic object around the plurality of other vehicles.

Figure 13:
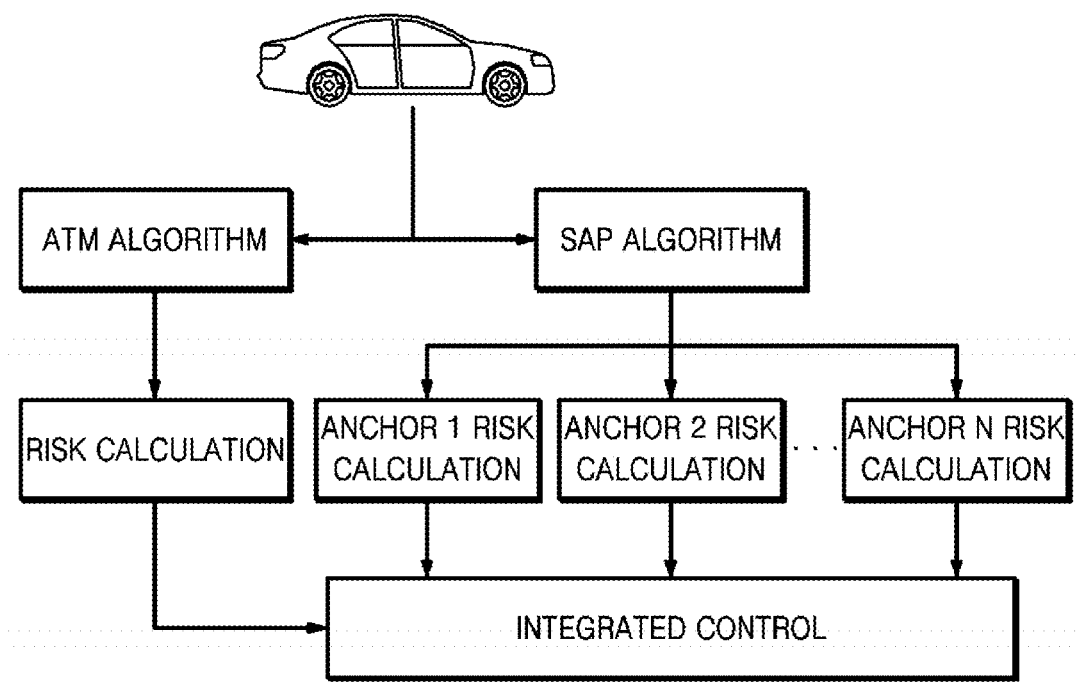
FIG. 13 is a diagram illustrating an integrated algorithm according to an exemplary embodiment of the present disclosure.

FIG. 13 is a diagram illustrating an integrated algorithm according to an exemplary embodiment of the present disclosure.

Referring to FIG. 13, the vehicle may form a UWB link with a tag of a nearby object. The vehicle can transmit or receive UWB pulse waves with the tag of the nearby object. The vehicle can perform the ATM algorithm and the SAP algorithm in parallel. The position of the object may be estimated through the ATM algorithm. A risk may be determined in the ATM algorithm. In the ATM algorithm, the risk determination may be performed using the UWB pulse waves received from the tag and the position of the object estimated through the ATM algorithm. After the risk determination is performed, a probability of collision with the object, a distance from the object, and an expected time of collision with the object may be determined. The probability of collision with the object, the distance from the object, and the expected time of collision with the object may correspond to a risk determination value. When the collision with the object is expected by use of the probability of collision with the object, the distance from the object, and the expected time of collision with the object, a vehicle alarm flag or a flag for vehicle control may be sent to the control device. The probability of collision with the object, the distance from the object, and the expected time of collision with the object, the vehicle alarm flag, and the flag for vehicle control may be sent to an integrated controller.

In the SAP algorithm, the risk determination may be performed for each anchor. The risk determination may be performed from anchor 1 to anchor n. The risk determination may be performed by use of the position of the object estimated through the SAP algorithm for each anchor. Each anchor can send the risk determination value and the estimated position of the object to the integrated controller. The integrated controller may compare the determination value for each anchor of the SAP algorithm with the risk determination value of the ATM algorithm. The integrated controller may be configured to determine the reliability in consideration of a comparison result, an accumulated error amount, the LOS situation, and the NLOS situation. The integrated controller may send a vehicle braking flag, the vehicle alarm flag, and the like to the control device using the determined reliability.

Figure 14:
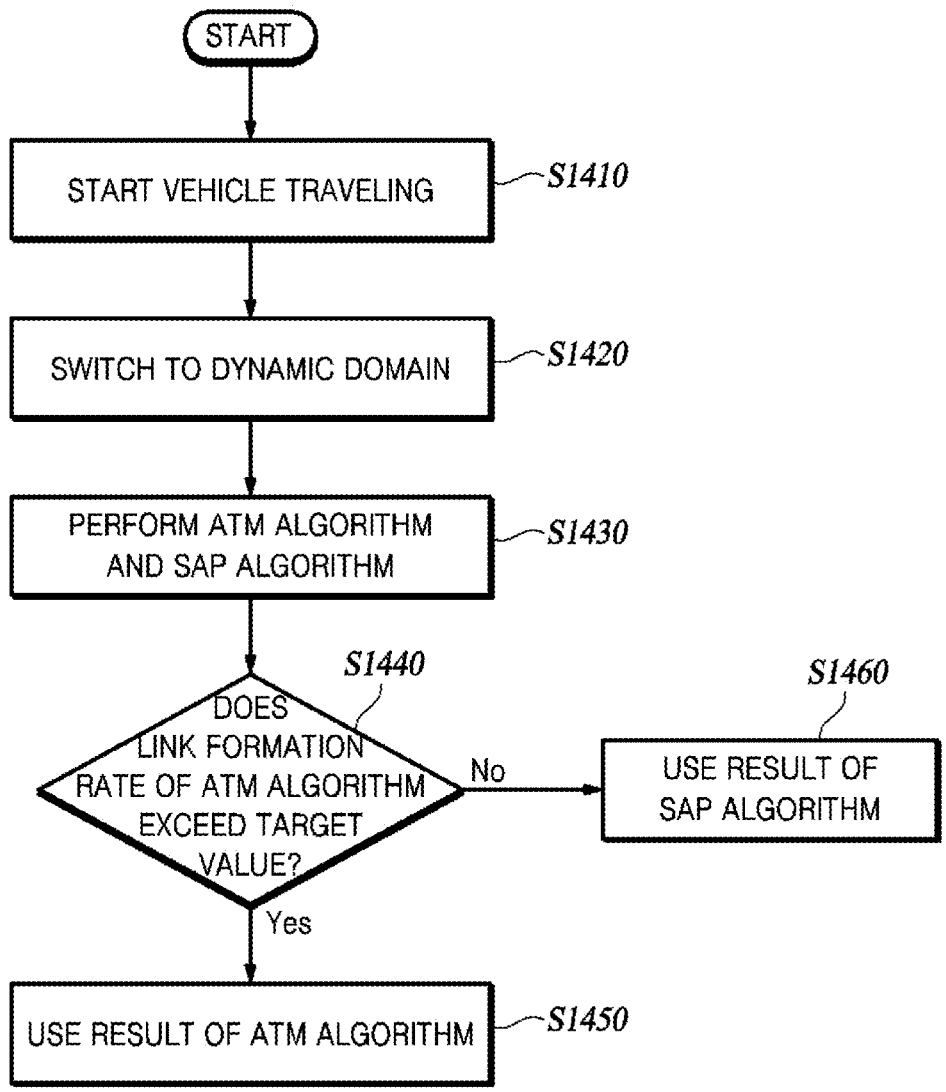
FIG. 14 is a diagram illustrating an integrated algorithm according to another exemplary embodiment of the present disclosure.

FIG. 14 is a diagram illustrating an integrated algorithm according to another exemplary embodiment of the present disclosure.

Referring to FIG. 14, the driver may start vehicle traveling (S1410). The vehicle may be switched from the static domain to the dynamic domain (S1420). The ATM algorithm and the SAP algorithm may be performed (S1430). The control device may issue a command to operate the ATM algorithm and the SAP algorithm. The ATM algorithm and the SAP algorithm may be performed in parallel. A determination may be made as to whether the link formation rate of the ATM algorithm exceeds a target value (S1440). The target value may be any value. When the link formation rate of the ATM algorithm exceeds the target value (S1440—YES), the estimated position of the object and the risk determination value obtained by performing the ATM algorithm, for example, may be used (S1450). When the link formation rate of the ATM algorithm does not exceed the target value (S1440—NO), the estimated position of the object and risk determination value obtained by performing the SAP algorithm, for example, may be used (S1460).

Figure 15:
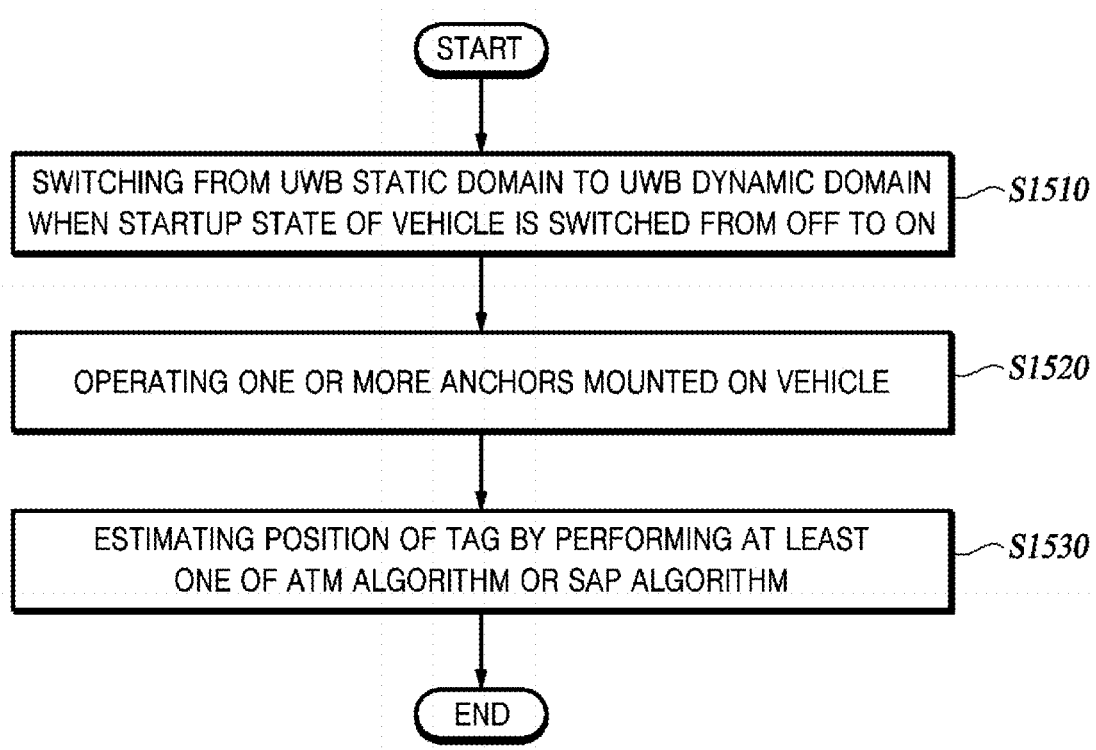
FIG. 15 is a diagram illustrating a position estimation method according to an exemplary embodiment of the present disclosure.

FIG. 15 is a diagram illustrating a position estimation method according to an exemplary embodiment of the present disclosure.

Referring to FIG. 15, when a startup state of the vehicle is switched from OFF to ON, the position estimation device may switch from the UWB static domain to the UWB dynamic domain (S1510). The position estimation device may operate one or more anchors mounted on the vehicle (S1520). The position estimation device may estimate the position of the tag by performing at least one of the ATM algorithm and the SAP algorithm. One or more anchors and the tag may transmit or receive UWB pulse waves. When the speed of the vehicle is zero and the vehicle has started up, the UWB dynamic domain may be maintained. The position estimation device may control the vehicle or provide an alarm to the driver based on the position of the tag.

Estimating the position of the tag may include searching for another vehicle around the vehicle using a GPS, requesting one or more anchors mounted on the other vehicle to operate, forming a UWB link with the one or more anchors mounted on the other vehicle, and receiving an estimated position of an object around the other vehicle from the other vehicle. The other vehicle may form the UWB link with the tag of the object. The other vehicle may estimate the position of the object by performing at least one of the ATM algorithm and the SAP algorithm.

Estimating the position of the tag may include estimating the position of the tag using the risk determined from the ATM algorithm and the risk of the one or more anchors determined from the SAP algorithm. Estimating the position of the tag may include estimating the position of the tag by performing the ATM algorithm when the link formation rate of the ATM algorithm exceeds a predetermined threshold value. Estimating the position of the tag may include estimating the position of the tag by performing the SAP algorithm when the link formation rate of the ATM algorithm does not exceed the predetermined threshold value.

The ATM algorithm may be an algorithm for identifying one or more LOS anchors from among one or more anchors mounted on the vehicle, selecting a reference anchor from the one or more LOS anchors, and estimating the position of the tag using three reference anchors and a trilateration technique when a number of reference anchors is three. The SAP algorithm may be an algorithm for identifying one or more LOS anchors from among one or more anchors mounted on the vehicle, selecting a reference anchor from the one or more LOS anchors, selecting three coordinates from a movement route of the vehicle when a number of reference anchors is one, and estimating the position of the tag using the three coordinates and an estimated distance between the reference anchor and the tag.

According to an exemplary embodiment of the present disclosure, it is possible to provide a method and device for estimating a position of an object using three anchors.

Furthermore, according to an exemplary embodiment of the present disclosure, it is possible to provide a method and device for estimating a position of an object using one anchor.

Furthermore, according to an exemplary embodiment of the present disclosure, it is possible to provide a method and device for improving a link formation rate using one anchor.

Furthermore, according to an exemplary embodiment of the present disclosure, it is possible to provide a method and device for classifying anchors into LOS (line of sight) anchors and NLOS (none line of sight) anchors.

Furthermore, the present disclosure may provide a method and device for converting from a static domain to a dynamic domain.

Furthermore, the present disclosure may provide a method and device for estimating a position of an object using an integrated algorithm.

Effects which may be obtained in an exemplary embodiment of the present disclosure are not limited to the above-described effects, and other effects not described may be clearly understood by those skilled in the art to which the present disclosure belongs from the following description.

The respective components of the device or method according to an exemplary embodiment of the present disclosure may be implemented by hardware or software, or may be implemented by a combination of the hardware and the software. Furthermore, a function of each component may be implemented by software and a microprocessor may be implemented to execute the function of the software corresponding to each component.

Various implementation examples of the systems and techniques described herein may be realized by a digital electronic circuit, an integrated circuit, an FPGA (field programmable gate array), an ASIC (application specific integrated circuit), computer hardware, firmware, software, and/or a combination thereof. These various implementation examples may be implemented by one or more computer programs executable on a programmable system. The programmable system includes at least one programmable processor (which may be a special purpose processor or may be a general purpose processor) connected to receive data and instructions from a storage system, at least one input device, and at least one output device and transfer data and instructions to these. The computer programs (also known as programs, software, software applications, or code) include instructions for the programmable processor and are stored in a "computer-readable recording medium".

The computer-readable recording medium includes any type of recording devices in which data that can be read by a computer system is stored. The computer-readable recording medium may be a non-volatile or non-transitory medium, such as a ROM, a CD-ROM, a magnetic tape, a floppy disk, a memory card, a hard disk, a magneto-optical disc, and a storage device, and may further include a transitory medium such as a data transmission medium. Furthermore, the computer-readable recording medium may be distributed in network-connected computer systems, and computer-readable code may be stored and executed in a distributed manner.

Although a case in which respective processes are sequentially executed in the flowchart and timing diagram in the present specification has been described, this is merely illustrative of the technical spirit of the exemplary embodiment of the present disclosure. In other words, since various changes and modifications can be made by those skilled in the art to which the exemplary embodiment of the present disclosure pertains by executing the respective processes in order other than those described in the flowchart and timing diagram or executing one or more of the respective processes in parallel without departing from essential characteristics of the exemplary embodiment of the present disclosure, the flowchart and timing diagram is not limited to a time-series order.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A position estimation method performed by a position estimation apparatus, the position estimation method comprising:
   switching, by at least one processor of the position estimation apparatus, from an ultra wideband (UWB) static domain to a UWB dynamic domain when a startup state of a vehicle is switched from OFF to ON;
   operating, by the at least one processor, one or more anchors mounted on the vehicle; and
   estimating, by the at least one processor, a position of a tag by performing at least one of an advanced trilateration measurement (ATM) algorithm and a smart anchor positioning (SAP) algorithm,
   wherein the one or more anchors and the tag transmit and receive UWB pulse waves,
   wherein the SAP algorithm is an algorithm for identifying one or more line of sight (LOS) anchors among the one or more anchors mounted on the vehicle, selecting a reference anchor from the one or more LOS anchors, selecting three coordinates from a movement route of the vehicle when a number of reference anchors is one, estimating three distances between the reference anchor and the tag at the three coordinates and estimating the position of the tag by applying a trilateration technique using the three coordinates and the three distances.

2. The method of claim 1, wherein the ATM algorithm is an algorithm for identifying one or more line of sight (LOS) anchors among the one or more anchors mounted on the vehicle, selecting the reference anchor from the one or more LOS anchors, and estimating the position of the tag using three reference anchors and the trilateration technique when the number of reference anchors is three.

3. The method of claim 1, further including:
   maintaining, by the at least one processor, the UWB dynamic domain when a speed of the vehicle is zero and the vehicle has started up.

4. The method of claim 1, further including:
   controlling, by the at least one processor, the vehicle or providing an alarm to a driver based on the position of the tag.

5. The method of claim 1, wherein the estimating of the position of the tag includes:
   searching for another vehicle around the vehicle using a Global Positioning System (GPS);
   requesting one or more anchors mounted on the another vehicle to operate;
   forming a UWB link with the one or more anchors mounted on the another vehicle; and
   receiving an estimated position of an object around the another vehicle from the another vehicle.

6. The method of claim 5,
   wherein the another vehicle forms the UWB link with the tag of the object, and
   wherein the another vehicle estimates a position of the object by performing at least one of the ATM algorithm and the SAP algorithm.

7. The method of claim 1, wherein the estimating of the position of the tag includes estimating the position of the tag using a risk determined from the ATM algorithm and a risk of the one or more anchors determined from the SAP algorithm.

8. The method of claim 1, wherein the estimating of the position of the tag includes estimating the position of the tag by performing the ATM algorithm when a link formation rate of the ATM algorithm exceeds a predetermined threshold value.

9. The method of claim 1, wherein the estimating of the position of the tag includes estimating the position of the tag by performing the SAP algorithm when a link formation rate of the ATM algorithm does not exceed a predetermined threshold value.

10. A position estimation apparatus comprising a memory and a plurality of processors, wherein at least one of the plurality of processors is configured to:

switch from an ultra wideband (UWB) static domain to a UWB dynamic domain when a startup state of a vehicle is switched from OFF to ON, operate one or more anchors mounted on the vehicle, and estimate a position of a tag by performing at least one of an advanced trilateration measurement (ATM) algorithm and a smart anchor positioning (SAP) algorithm, wherein the one or more anchors and the tag transmit and receive UWB pulse waves, and wherein the SAP algorithm is an algorithm for identifying one or more line of sight (LOS) anchors among the one or more anchors mounted on the vehicle, selecting a reference anchor from the one or more LOS anchors, selecting three coordinates from a movement route of the vehicle when a number of reference anchors is one, estimating three distances between the reference anchor and the tag at the three coordinates and estimating the position of the tag by applying a trilateration technique using the three coordinates and the three distances.

11. The apparatus of claim 10, wherein the ATM algorithm is an algorithm for identifying one or more line of sight (LOS) anchors among the one or more anchors mounted on the vehicle, selecting the reference anchor from the one or more LOS anchors, and estimating the position of the tag using three reference anchors and the trilateration technique when the number of reference anchors is three.

12. The apparatus of claim 10, wherein the at least one processor is configured to maintain the UWB dynamic domain when a speed of the vehicle is zero and the vehicle has started up.

13. The apparatus of claim 10, wherein the at least one processor is configured to control the vehicle or to provide an alarm to a driver based on the position of the tag.

14. The apparatus of claim 10, wherein the at least one processor is configured to:

search for another vehicle around the vehicle using a Global Positioning System (GPS), request one or more anchors mounted on the another vehicle to operate, form a UWB link with the one or more anchors mounted on the another vehicle, and receive an estimated position of an object around the another vehicle from the another vehicle.

15. The apparatus of claim 14, wherein the another vehicle is configured to form the UWB link with the tag of the object, and wherein the another vehicle estimates a position of the object by performing at least one of the ATM algorithm and the SAP algorithm.

16. The apparatus of claim 10, wherein the at least one processor is configured to estimate the position of the tag using a risk determined from the ATM algorithm and a risk of the one or more anchors determined from the SAP algorithm.

17. The apparatus of claim 10, wherein the at least one processor is configured to estimate the position of the tag by performing the ATM algorithm when a link formation rate of the ATM algorithm exceeds a predetermined threshold value.

18. The apparatus of claim 10, wherein the at least one processor is configured to estimate the position of the tag by performing the SAP algorithm when a link formation rate of the ATM algorithm does not exceed a predetermined threshold value.

* * * * *